(12) United States Patent
Kwon et al.

(10) Patent No.: US 7,925,383 B2
(45) Date of Patent: Apr. 12, 2011

(54) BUILDING MANAGEMENT SYSTEM CONTROLLING HVAC BASED ON RECEIVED HVAC, DOOR, LIGHTING, AND OCCUPANCY STATES

(75) Inventors: Do-Hyung Kwon, Seoul (KR); Sang-Chul Youn, Seoul (KR); Duck-Gu Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 11/972,687

(22) Filed: Jan. 11, 2008

(65) Prior Publication Data

US 2008/0186148 A1    Aug. 7, 2008

(30) Foreign Application Priority Data

Feb. 5, 2007    (KR) .......................... 10-2007-0011832

(51) Int. Cl.
*G05D 23/00*    (2006.01)
*G05B 11/01*    (2006.01)
(52) U.S. Cl. ........................................ 700/276; 700/19
(58) Field of Classification Search .................. 700/275, 700/276, 277, 278, 19
See application file for complete search history.

(56) References Cited

U.S. PATENT DOCUMENTS

| | | | | |
|---|---|---|---|---|
| 4,713,591 A | * | 12/1987 | McCloskey | 318/257 |
| 5,909,378 A | | 6/1999 | De Milleville | 700/276 |
| 5,933,085 A | | 8/1999 | Holcomb et al. | 340/5.66 |
| 6,081,750 A | | 6/2000 | Hoffberg et al. | 700/17 |
| 6,237,854 B1 | | 5/2001 | Avni | 236/51 |
| 2005/0097902 A1 | | 5/2005 | Kwon et al. | 62/126 |
| 2005/0209739 A1 | | 9/2005 | Kwon et al. | 700/277 |
| 2006/0212175 A1 | | 9/2006 | Kim et al. | 700/277 |
| 2007/0244882 A1 | | 10/2007 | Cha et al. | 707/5 |

FOREIGN PATENT DOCUMENTS

EP    0802472 A    10/1997
KR    10-0565514    3/2006

OTHER PUBLICATIONS

English language Abstract of KR 1020050055905.
U.S. Appl. No. 11/972,195 to Kim et al, which was filed on Jan. 10, 2008.

* cited by examiner

*Primary Examiner* — Ryan A Jarrett
(74) *Attorney, Agent, or Firm* — KED & Associates, LLP

(57) ABSTRACT

A building management system controls an operation of a system related to state information provided from multiple systems within the building management system among the multiple systems. Because the building management system is operated to control the multiple systems in an interworking manner, the operation efficiency of the building management system can be improved.

2 Claims, 6 Drawing Sheets

BUILDING MANAGEMENT SYSTEM CONTROLLING HVAC BASED ON RECEIVED HVAC, DOOR, LIGHTING, AND OCCUPANCY STATES

BACKGROUND OF THE INVENTION

1. Field of the Invention

The present invention relates to a building management system and, more particularly, to a building management system and its operation control method capable of integrally or collectively controlling operations of multiple systems based on state information of the multiple systems accommodated in a building.

2. Description of the Related Art

Recently, as the facilities of buildings are being modernized, an automatic control system for automatically controlling sub-systems such as a power management, illumination, air-conditioning, disaster prevention and security management equipment installed in buildings is increasingly used, and a building management system that can integrally (collectively) manage the sub-systems is being actively developed.

However, with respect to multiple systems located in a building, the related art building management system independently controls and monitors each operation of each system that includes respective state information.

Thus, the related art building management system has a problem in that it cannot control different systems according to the state of a particular system, resulting in a failure of effectively managing various systems accommodated in the building.

For example, if a door is open while an air-conditioner system performs an air cooling operation or an air heating operation, cool air or heated air would be externally discharged to unnecessarily consume energy, or if there is no person in a room while the air-conditioner system performs an air cooling operation or an air heating operation, energy would be also unnecessarily consumed.

SUMMARY OF THE INVENTION

Therefore, in order to address the above matters, the various features described herein have been conceived. One aspect of the exemplary embodiments is to provide a building management system capable of controlling multiple systems in 10 an interworking manner based on state information of each of the multiple system included in the building management system, thereby effectively managing a building, and its operation control method.

This specification provides a building management system that may include: a central control unit that receives state information from a first system of a building and controls an operation of a second system of the building based on the state information.

This specification also provides a method of controlling a system of a building, that may include: receiving state information from a first system of the building; and controlling an operation of a second system of the building based on the state information.

The foregoing and other objects, features, aspects and advantages of the present invention will become more apparent from the following detailed description of the present invention when taken in conjunction with the accompanying drawings.

DETAILED DESCRIPTION OF THE INVENTION

The building management system and its operation control method according to the exemplary embodiment of the present invention will now be described with reference to the accompanying drawings.

Figure 1:
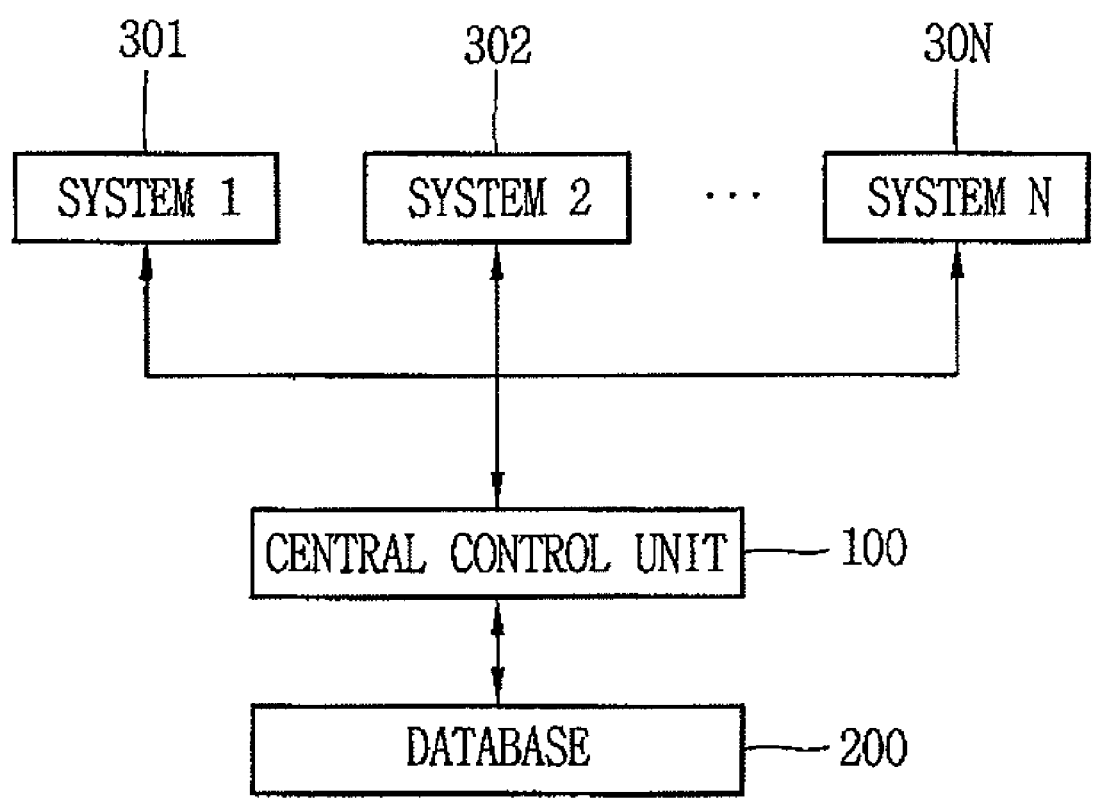
FIG. 1 is a view showing the construction of a building management system according to one exemplary embodiment of the present invention.

FIG. 1 is a view showing the construction of a building management system according to an exemplary embodiment of the present invention.

As shown in FIG. 1, the building management system includes: multiple systems 301~30N that can be separately operated; a central control unit 100 that communicates with the multiple systems 301~30N, selects at least one system related to state information transmitted from an arbitrary system among the multiple systems 301~30N, based on the state information transmitted from the arbitrary system, generates a control signal corresponding to the state information, and controls an operation of the at least one selected system based on the state information; and a database 200 that previously stores the control information corresponding to the state information.

The multiple systems 301~30N may include one or more of a ventilation system, an entry management system, a system that detects whether a room is occupied, an automated (unmanned) system, a lighting system, a car parking management system, a door management system, and an air-conditioner system, etc.

The central control unit 100 analyzes state information of each system transmitted from the multiple systems 301~30N, and controls an operation of an arbitrary system corresponding to the state information according to a previously stored control information corresponding to the state information. Here, the arbitrary system may be one or more of the multiple systems 301~30N.

The central control unit 100 generates the corresponding control signal based on conditions previously set by the user as stored in the database 200 and the state information provided from the multiple systems 301~30N, and controls the operation of the arbitrary system according to the control signal.

The database 200 stores the control information corresponding to the state information according to the state information of each of the multiple systems 301~30N, and the stored control information can be used to control the multiple systems 301~30N in an associated (or cooperating, interworking, etc.) manner.

The database 200 stores conditions previously set by the user such as a state in which a door is open for more than 10 seconds or a state in which no person is detected in a room for more than 10 minutes, and the like.

For example, the central control unit 100 receives the state information from the multiple systems 301~30N. Here, for example, the state information may be information indicating a state that the door is open. When the door-opened state is maintained by more than time previously set by the user, the central control unit 100 generates a signal for controlling an operation of a door opening/closing system or an air-conditioner system, and controls the operation of the door opening/closing system or the air-conditioner system according to the generated signal.

Figure 2:
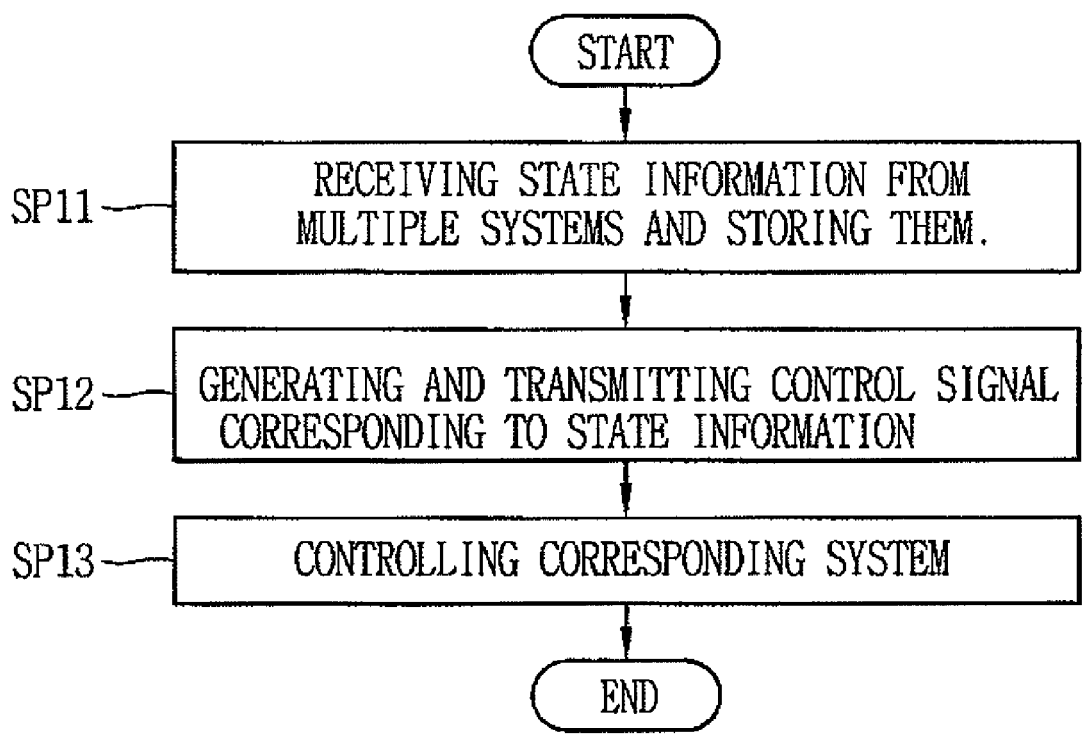
FIG. 2 is a flow chart illustrating the process of a method for controlling an operation of the building management system according to one exemplary embodiment of the present invention.

FIG. 2 is a flow chart illustrating the process of a method for controlling an operation of the building management system according to one exemplary embodiment of the present invention.

First, the central control unit 100 receives state information from an arbitrary system among the multiple systems 301~30N. The received state information is stored in the database 200 (SP11).

Thereafter, based on the stored state information, the central control unit 100 selects at least one system related to the state information from the multiple systems, generates a control signal corresponding to the state information stored in the database 200 based on the stored state information, and transmits the control signal to the at least one system based on the state information (SP12).

Upon receiving the control signal, the at least one selected system performs an operation corresponding to the received control signal with priority over other control signals (SP13).

Figure 3:
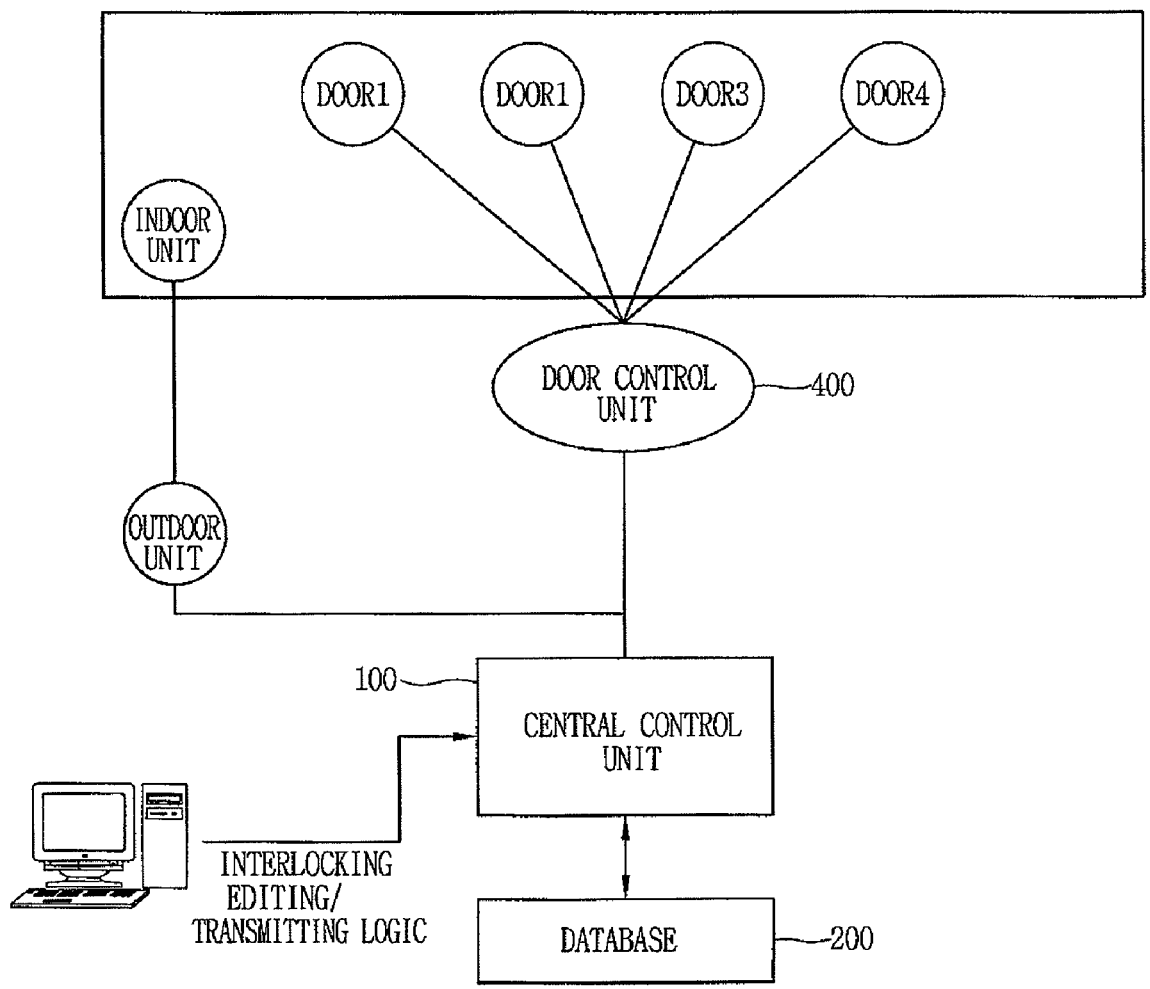
FIG. 3 is a view showing the construction of a building management system according to another exemplary embodiment of the present invention.

FIG. 3 is a view showing the construction of a building management system according to another exemplary embodiment of the present invention.

As shown in FIG. 3, the building management system according to the exemplary embodiment of the present invention includes a central control unit 100, a database 200, and a door control unit 400.

The door control unit 400 detects an opened state of a door, generates door state information based on a communication protocol according to the detection result, and transmits the door state information to the central control unit 100.

The central control unit 100 analyzes the door state information transmitted from the door control unit 400 and controls an operation of an air-conditioner according to the analysis result.

In a different embodiment of the present invention, the central control unit 100 may control the operation of the air-conditioner based on door state information transmitted from the door control unit 400 and various air-conditioner operation patterns according to conditions previously set by the user.

The database 200 previously stores operations patterns of the air-conditioner which correspond to the various conditions previously set by the user.

In addition, the database 200 also stores state information of each system (the door management system, the ventilation system, the lighting system, a temperature management system, and the like).

The operation of the building management system according to the exemplary embodiment of the present invention will now be described with reference to the accompanying drawings.

First, the central control unit 100 and the door control unit 400 may be connected according to an RS-485 communication method, which is the communication protocol standard capable of establishing a long distance network. In addition, the central control unit 100 and the door control unit 400 may be also connected according to a different wired/wireless communication method.

In this state, the door control unit 400 detects opening of the door, generates the door state information based on the communication protocol according to the detection result, and transmits the door state information to the central control unit 100.

Upon receiving the door state information from the door control unit 400, the central control unit 100 analyzes the information, and controls the operation of the air-conditioner or opening and closing of the door according to the analysis result.

Figure 4:
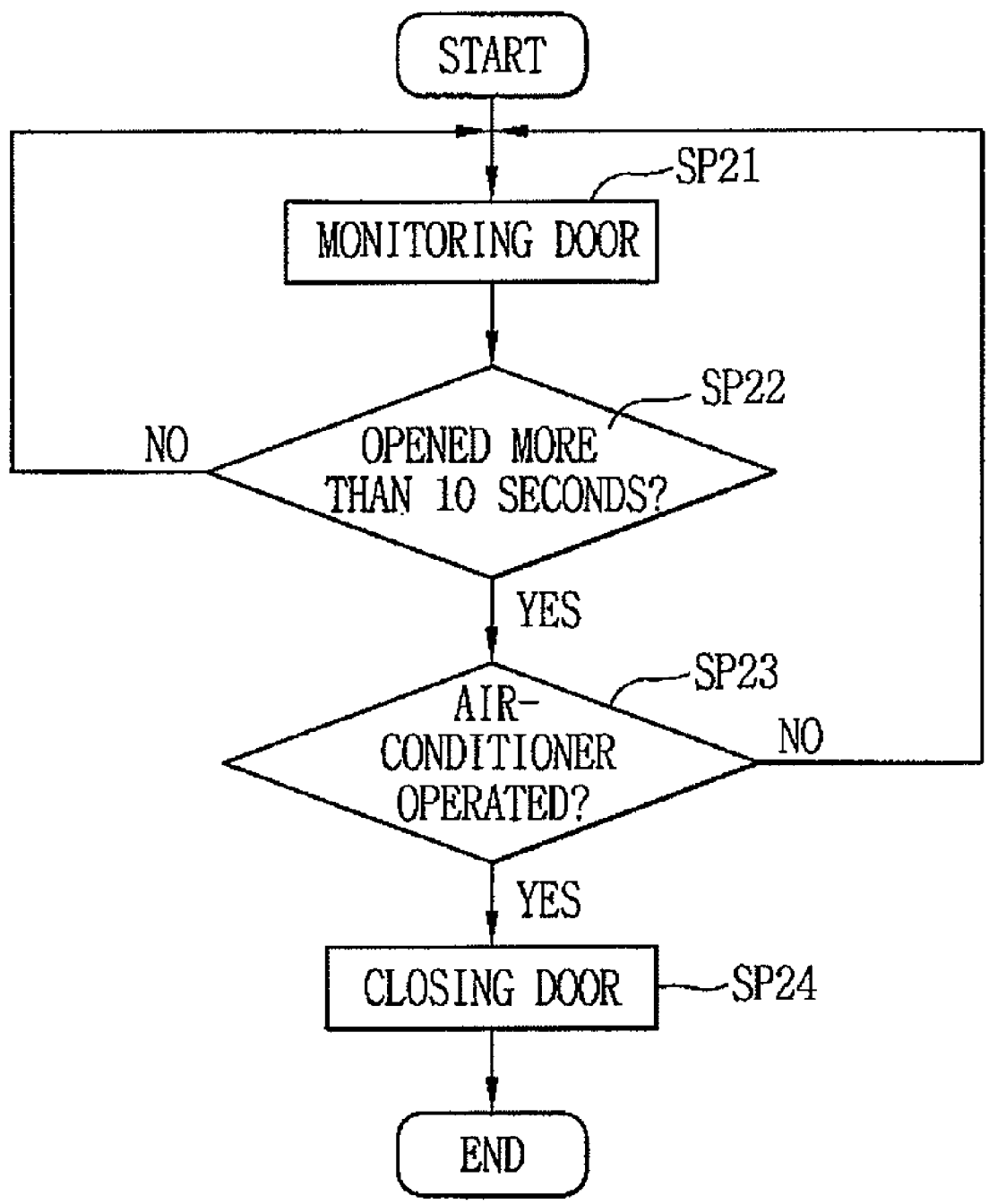
FIG. 4 is a flow chart illustrating the process of controlling a door in the method for controlling the operation of the building management system according to another exemplary embodiment of the present invention.

Here, the operation of opening and closing the door according to the exemplary embodiment of the present invention will now be described with reference to FIG. 4.

First, the door control unit 400 monitors whether at least one door is opened or closed. Namely, the door control unit 400 detects whether an arbitrary door is opened, and when the corresponding door is opened, the door control unit 400 transmits corresponding door state information to the central control unit 100 (SP21).

Next, the central control unit 100 checks whether the corresponding door has been opened by more than ascertain time (e.g., more than 10 seconds0 according to the door state information (SP22). Upon checking, if the arbitrary door has been opened by more than 10 seconds, the central control unit 100 checks whether the air-conditioner is being operated (SP23). Upon checking, when the air-conditioner is being operated, the central control unit 100 closes the corresponding door (SP24).

If, however, the air-conditioner is not operated upon checking whether the air-conditioner is operated or not, the process returns to the step SP21 of monitoring whether at least one door is opened or closed without controlling the corresponding door or the air-conditioner.

Figure 5:
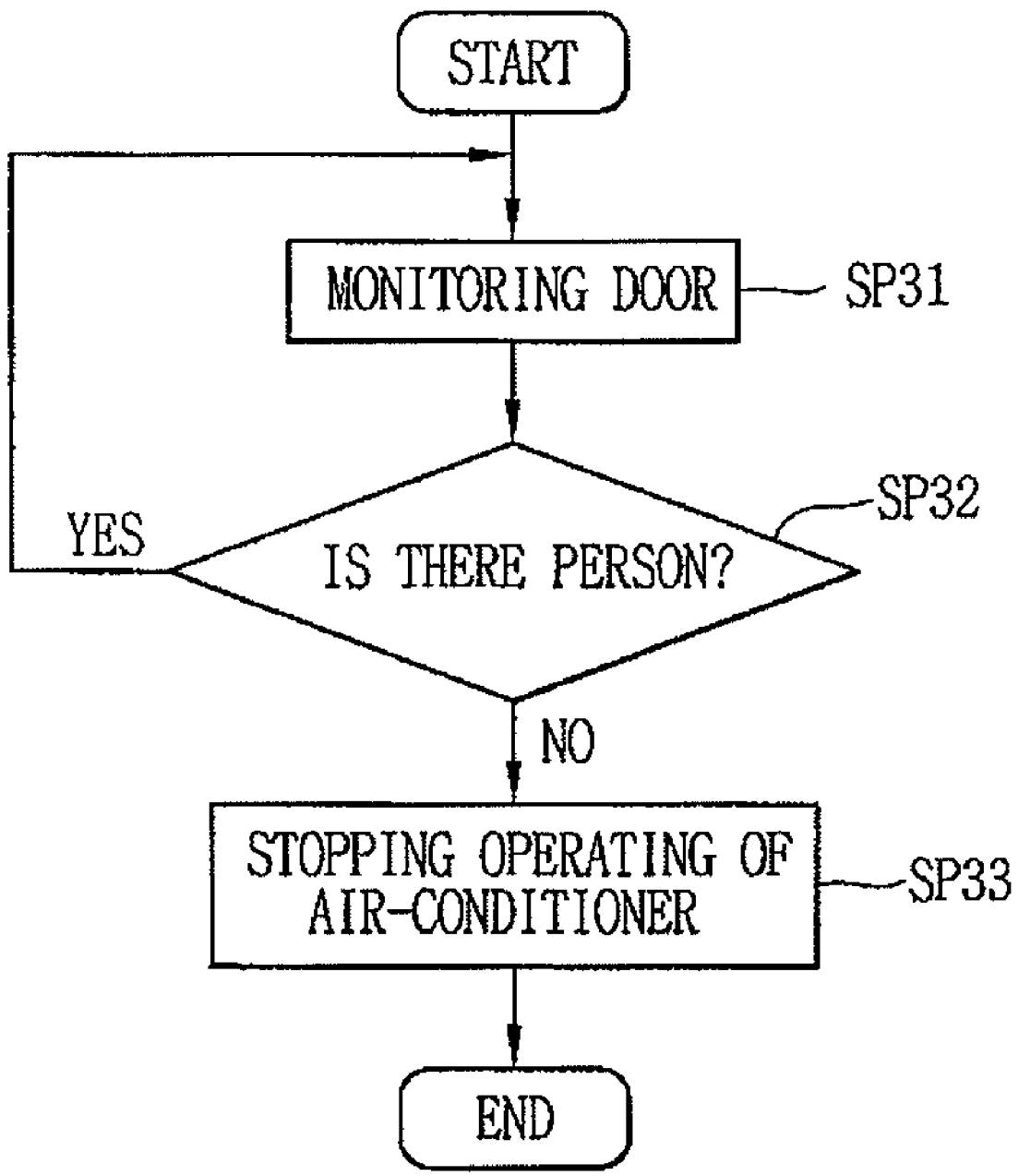
FIG. 5 is a flow chart illustrating the process of controlling an air-conditioner in the method for controlling the operation of the building management system according to the exemplary embodiment of the present invention.

Controlling of the operation of the air-conditioner will now be described with reference to FIG. 5.

First, the door control unit 400 monitors whether at least one door is opened or closed. Namely, the door control unit 400 detects whether an arbitrary door is opened, and when a corresponding door is opened, the door control unit 400 transmits corresponding door state information to the central control unit 100 (SP31).

Next, the central control unit 100 checks whether there is a person in a room based on whether the arbitrary door is opened or not and whether a lighting system has been turned on or not (SP32).

For example, when the door is opened, the central control unit 100 checks whether there is a person in the room according to a previous state. Namely, when the door is opened with a person in the room, the central control unit 100 recognizes that the person in the room goes out of the room. When the door is opened with no person in the room, the central control unit 100 recognizes that a person goes into the room.

In addition, when a certain room is in a turned-on state by the lighting control system, the central control unit recognizes that there is a person in the certain room.

If there is no person in the room, the central control unit 100 stops an operation of an air-conditioner of the corresponding room (SP33).

If, however, there is a person in the room, the central control unit 100 returns to the step SP31 of monitoring whether at least one door is opened or closed without controlling the corresponding door management system, the lighting system and the air-conditioner.

A different embodiment of the present invention will now be described with reference to FIG. 6.

Figure 6:
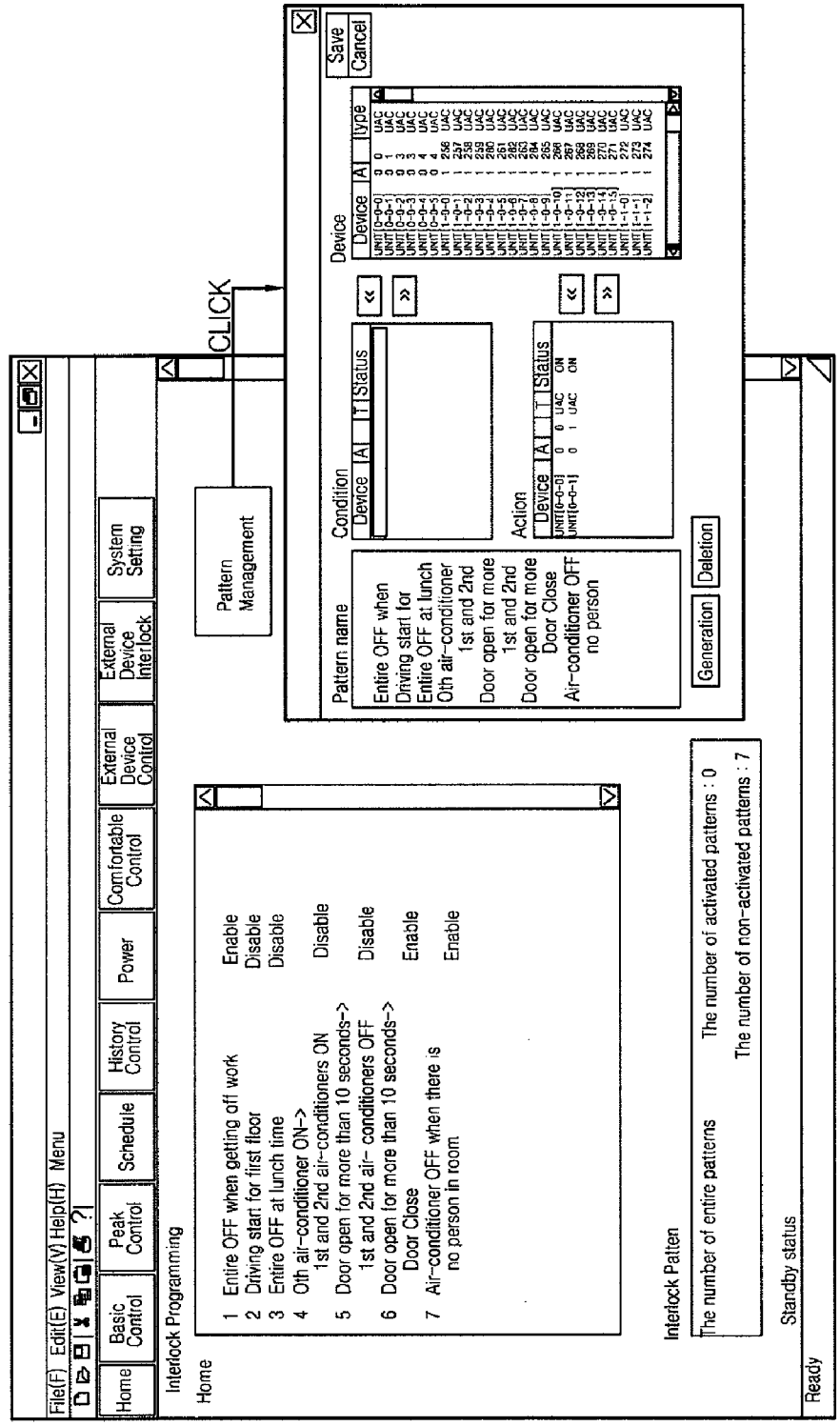
FIG. 6 is a view showing operation patterns of various air-conditioners stored in a database in FIG. 3.

First, various air-conditioner operation patterns set by the user as shown in FIG. 6 are previously stored in the database 200.

In this state, the central control unit 100 checks whether the state information received from the multiple systems meet the pre-set conditions. When the set conditions are met, the central control unit 100 controls the air-conditioner according to an air-conditioner operation pattern corresponding to the set conditions as met.

For example, the central control unit 100 may control the operation of the air-conditioner according to operation patterns of the air-conditioner set to be operated at a particular time, control the operation of the air-conditioner according to a pre-set operation pattern of the air-conditioner (e.g., the air-conditioner is turned off when the door is open for more than 10 seconds), generate door close control information based on state information of the door and state information of the air-conditioner and apply the door close control information to the door control unit 400, or generate the door close information and apply the corresponding information to the door control unit 400 when the air-conditioner is being operated in a state that the door has been opened for more than 10 seconds, and so on.

Besides the conditions set by the user, various other conditions can be added in operating the multiple systems in an interworking manner.

As so far described, the building management system according to the present invention has the following advantages.

That is, because the multiple systems can be controlling in an interworking manner based on state information of the multiple systems, a building having the multiple system can be effectively controlled.

Namely, whether or not the door or a room is opened or close is recognized while the air-conditioner performing an air cooling operation or air heating operation, and when the door is open for more than a certain time, the door of the room is closed according to whether the air-conditioner is operated or not, thereby preventing a waste of energy.

In addition, whether or not a person is in a room can be detected, and if there is no person in the room, the operation of the air-conditioner is stopped, thereby preventing a waste of energy according to an unnecessary operation of the air-conditioner.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling a plurality of management systems in a building comprising:
    establishing a network connection between a central controller and an air-conditioning management system, a door management system, a lighting control system, and an occupancy detection system provided in a building, wherein the network connection is based on a network protocol;
    receiving a first state information from the air-conditioning management system including a state of an HVAC unit provided in the building;
    receiving a second state information from the door management system including a state of a door positioned in the building;
    receiving a third state information from the lighting control system including a state of a light in the building;
    receiving a fourth state information from the occupancy detection system including an occupancy status of the building detected by the occupancy detection system;
    retrieving at the central controller a predetermined building state control information stored on a database connected to the network;
    determining at the central controller whether an operating state for the plurality of systems should be changed based on the retrieved predetermined building state control information and the received first state information that the HVAC unit is either on or off, the second state information that the door is either open or closed, the third state information that the lights in the building are on or off, and the fourth state information that the building is either occupied or unoccupied; and
    transmitting a first control signal from the central controller to the air-conditioning management system to control the HVAC unit to be either on or off based on the determination whether the operating state should be changed, wherein the central controller determines that the operation of the HVAC unit should be stopped when the HVAC unit is on, the door has been open for a predetermined amount of time, the lights are turned off, and the building is unoccupied.

2. A central building management system for remotely managing a plurality of management systems in a building, comprising:
    a plurality of network interface devices configured to establish a network connection between a central controller and an air-conditioning management system, a door management system, a lighting control system, and an occupancy detection system provided in a building, wherein the network connection is based on a network protocol;
    a receiver provided on the central controller configured to receive a first state information from the air-conditioning management system including a state of an HVAC unit provided in the building, receive a second state information from the door management system including a state of a door positioned in the building, receive a third state information from the lighting control system including a state of lights in the building, receive a fourth state information from the occupancy detection system including an occupancy status of the building detected by the occupancy detection system, and receive a predetermined building state control information stored on a database connected to the network; and
    a processor provided at the central controller configured to retrieve the predetermined building state control information, determine whether an operating state for the plurality of systems should be changed based on the retrieved predetermined building state control information and the received first state information that the HVAC unit is either on or off, the second state information that the door is either open or closed, a third state information that the lights in the building are either on or off, and the fourth state information that the building is either occupied or unoccupied, wherein the processor is further configured to transmit a first control signal from the central controller to the air-conditioning management system to control the HVAC unit to be either on or off based on the determination whether the operating state should be changed, wherein the central controller determines that the operation of the HVAC unit should be stopped when the HVAC unit is on the door has been open for a predetermined amount of time, the lights are turned off, and the building is unoccupied.

* * * * *